United States Patent [19]

Mangone

[11] Patent Number: 4,869,177
[45] Date of Patent: Sep. 26, 1989

[54] RAIL-HIGHWAY SEMITRAILER

[75] Inventor: Angelo Mangone, Matera, Italy

[73] Assignee: Ferrosud S.p.A., Matera, Italy

[21] Appl. No.: 174,396

[22] Filed: Mar. 28, 1988

[51] Int. Cl.⁴ ............................................. B60F 1/00
[52] U.S. Cl. ..................... 105/4.2; 105/4.3; 105/199.4; 280/DIG. 3
[58] Field of Search ............ 105/4.1, 4.2, 4.3, 3, 105/8.1, 199.4, 215.2; 280/DIG. 8

[56] References Cited

U.S. PATENT DOCUMENTS

| | | | |
|---|---|---|---|
| 1,272,486 | 7/1918 | McManis | 105/199.9 X |
| 2,787,971 | 4/1957 | Obes | 280/Dig. 8 |
| 2,934,217 | 4/1960 | Simmons et al. | 213/76 |
| 3,294,420 | 12/1966 | Martin | 280/DIG. 8 |
| 3,317,219 | 5/1967 | Hindin et al. | 280/DIG. 8 |
| 3,332,362 | 7/1967 | Fisher | 105/215.2 X |
| 3,802,578 | 4/1974 | Farnworth | 213/76 |
| 3,841,511 | 10/1974 | Haun | 280/DIG. 8 X |
| 3,854,597 | 12/1974 | McClure et al. | 213/76 |
| 4,015,720 | 4/1977 | Peché213 | 76 X/ |
| 4,342,265 | 8/1982 | Hindin et al. | 105/215.2 |
| 4,416,571 | 11/1983 | Krause | 105/4.1 X |
| 4,669,391 | 6/1987 | Wicks et al. | 105/4.3 |

FOREIGN PATENT DOCUMENTS

| | | | |
|---|---|---|---|
| 1293807 | 4/1960 | Fed. Rep. of Germany | 105/199.4 |
| 157690 | 12/1982 | Fed. Rep. of Germany | 105/199.4 |
| 1561318 | 3/1969 | France | 105/4.3 |

Primary Examiner—Andres Kashnikow
Attorney, Agent, or Firm—Fleit, Jacobson, Cohn, Price, Holman & Stern

[57] ABSTRACT

The semi-trailer is capable of traveling on roads or on rails. It is characterized in that both a rail truck and a highway carriage are rapidly removable. Therefore the semi-trailer can travel on roads with only the highway carriage, and on rails with only the rail truck. The advantage is a reduction in the tare of the rail-operable unit. An additional advantage is the lack of a need for all the means intended for maintaining the wheels of the highway carriage elevated above the plane of the rails when traveling on rails, which means are required for all prior art binary rail and road vehicles. Other characteristics of the invention are the coupling device between the semi-trailers, the system of connection of a center pin socket to a hemispherical center-bearing counter-element of the rail truck, and the use of special support props and jacks.

8 Claims, 4 Drawing Sheets

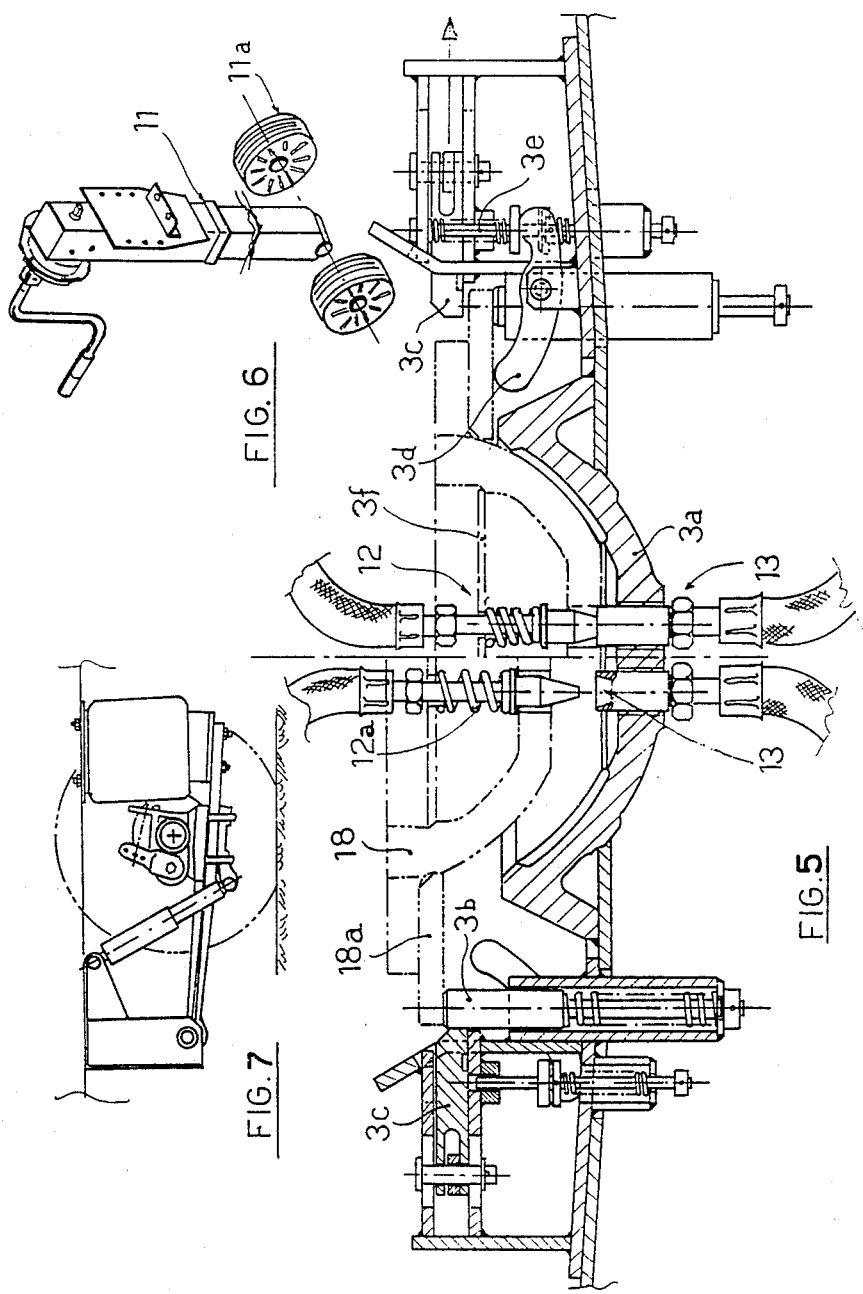

RAIL-HIGHWAY SEMITRAILER

BACKGROUND OF THE INVENTION

The invention relates to an item of railroad rolling stock which when desired, can travel on a highway as a normal highway truck trailer.

More particularly, it relates to a rail-operable semi-trailer which can be converted to a road-operable semi-trailer, or vice versa (a road-operable semi-trailer which is convertible to a rail-operable semi-trailer).

The notion of devising a vehicle adapted to travel on both roads and rails is not new. In the U.S., attempts in this direction were made around the end of the 1950s.

At the end of the 1970s, cars were implemented which were furnished with a single rectractable rail-operable axle mounted on one end of the car, whereby pneumatic tires could take over for the rail-operable wheels.

Such a system was not practicable in Europe because the maximum weight allowed on a single rail-operable axle was 20 or 22.5 tons, whereas in the U.S., 27–30 tons per axle is allowable.

It is permissible for highway trailers to have a gross weight of 36 (+5%) tons in some European countries, including Italy. This weight must be distributed among the front and rear wheels, however, and therefore such a system cannot function with a single rail-operable axletree, i.e., in the form of a rail-operable semi-trailer, without strict limitations being placed on payload during the rail travel.

Furthermore, such systems (with retractable rail-operable axletree) have increased weight due to the provision of the retractable rail-operable axletree itself, and thereby have reduced carrying capacity of the semi-trailer when on the highway.

In any event, this concept of a bimodal car for road and rail persisted, and recently a different type of vehicle has come into use which is adapted to travel on both roads and rails, wherein the car does not carry the rail-operable axles and wheels when traveling on roads, and when the car is to be used on rails, it is lowered onto one or more ordinary, standard-type trail trucks. The highway carriage remains connected to the semi-trailer, but its wheels are retracted upward to a suitable height above the rails, by means of a suitable device.

However, this more recent system also has certain drawbacks, due to the highway regulations of some European countries, particularly Italy, where the maximum weight of a highway semi-trailer is about 38 tons, and the maximum speed of a semi-trailer on a railroad when employing a standard reinforced rail truck is 90 km/hr. Moreover, the 38 tons plus 5 tons for the weight of the rail truck amounts to 43 tons, which is 21.5 tons per axle of the rail truck; and this weight is impermissible on all rail lines in Europe.

Stated differently, any time the semi-trailer can travel on roads at a total weight greater than 35 tons, not only is it impermissible to convert it into a semi-trailer which is rail-operable at a speed greater than 90 km/hr, but it is also necessary to employ a reinforced rail truck which weighs more and thereby lowers the payload.

Moreover, such a bimodal semi-trailer for road and rail, having a transportable rail truck, has additional disadvantages in practice.

The coupling presently used to couple together such semi-trailers for rail travel with a single rail truck, so that the semi-trailer operates as a rail-operable semi-trailer, is of the rigid type for horizontal coupling. Accordingly, to establish the coupling, it is necessary to coordinate the position for the hole receiving the locking pin, and this coordination must be effected both horizontally and vertically. This situation requires regulation of the *height of the support props* during the maneuver, and generally requires an operator for the insertion of the locking pin unless automatic means are provided.

Further, the fixing of the center-bearing counter-element of the semi-trailer to the center pin socket of the rail truck is carried out by a bar and a bracket which must be applied from the bottom, thereby requiring the operator to perform an awkward, arduous maneuver, or else requiring the provision of a pit between the tracks where the said operator can work more conveniently.

The pneumatic connection of the brake cylinder to the respective distributor of compressed air (or more generally, to the remainder of the pneumatic system) is a manual operation. If this connection is not made (e.g., due to operator error or oversight), the braking of the rail truck will be disabled.

Other disadvantages are connected with the fact that the semi-trailer can be aligned with the axis of the tracks only with the aid of the locomotive, and locomotive engineer must perform difficult maneuvers for this.

The general aim of the invention is to eliminate the above-mentioned disadvantages in a binary semi-trailer for traveling on roads and rails.

The principal specific object of the invention is to provide a binary semi-trailer whereby the empty weight can be reduced for both rail and road travel, by replacing the highway carriage by the rail truck, or vice versa, as required, such that only the highway carriage is present when traveling on roads, and only the rail truck is present when traveling on rails.

A second important specific object of the invention is to provide a binary semi-trailer wherein all means required for rail travel are dismounted when the highway carriage is connected in fixed mode to the semi-trailer.

A third important specific object of the invention is to provide a coupling between the semi-trailers which enables formation of railroad trains, which operates relatively rapidly and reliably.

The first and second specific objects are achieved by a semi-trailer in which the highway carriage is removable, i.e., the highway carriage is furnished with its own independent frame which incorporates coupled elastic suspensions and pneumatic and/or hydraulic lifting means, and is furnished with means of attaching it quickly to the semi-trailer which is adapted therefor.

The third specific object is achieved by a coupling system between the rail-operable semi-trailers which system simplifies the manuevers for forming a railroad train which maneuvers are carried out by the locomotive; and said coupling system is furnished with blocks, runners, pads or the like which prevent rolling movements of the semi-trailer around its longitudinal axis.

BRIEF DESCRIPTION OF THE DRAWINGS

The inventive semi-trailer will be described in detail with reference to the attached five plates of drawings.

FIG. 1a shows a possible embodiment of the mounting system of the highway carriage;

FIG. 5 shows details of the center pin socket and hemispherical center-bearing counter-element for mounting the rail truck;

FIG. 6 shows the front support prop, with transverse wheels; and

FIG. 7 shows an example of a currently used pneumatic suspension on the highway carriage.

DESCRIPTION OF THE PREFERRED EMBODIMENT

Figure 1:
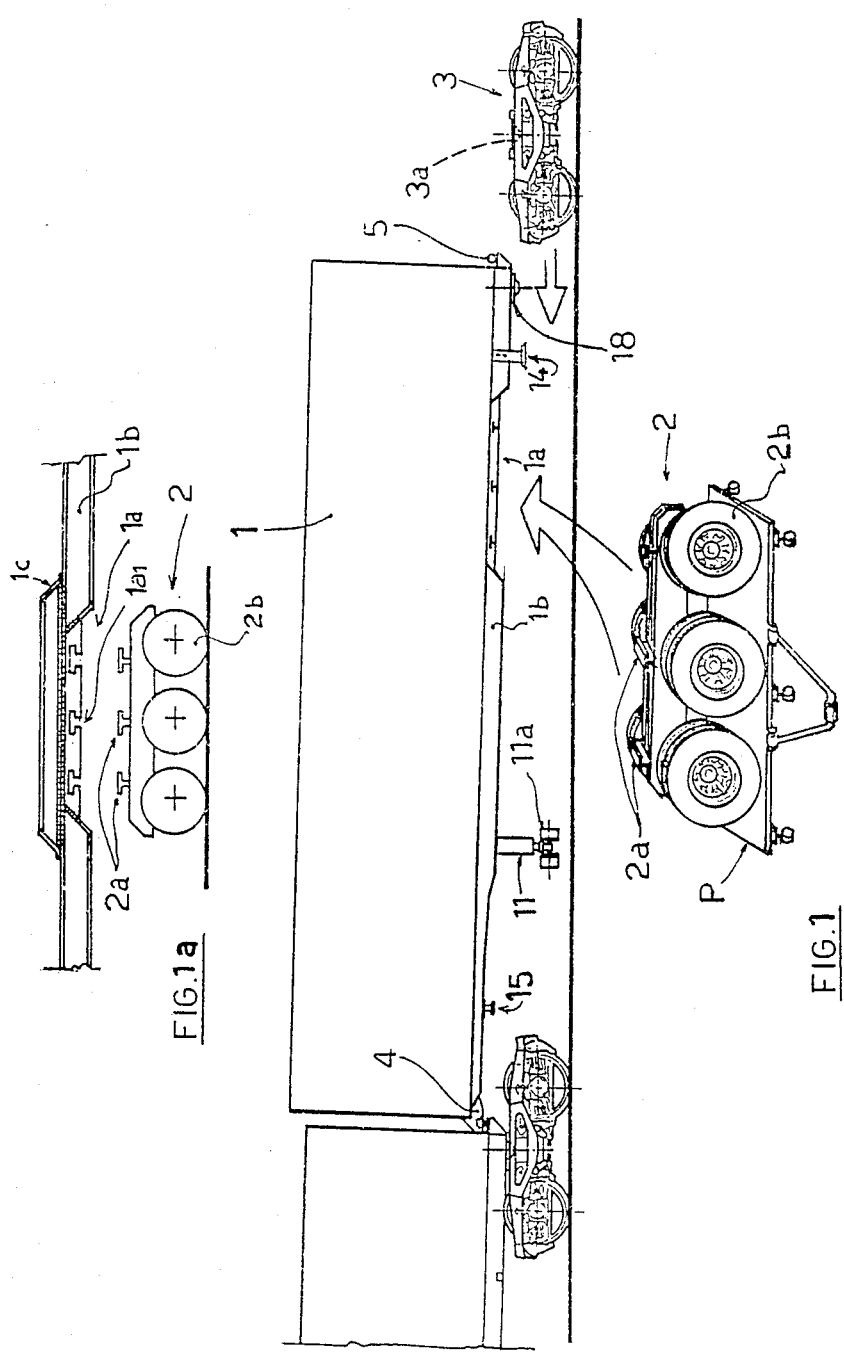
FIG. 1 shows the inventive semi-trailer with the rail truck on the right in the position prior to mounting, and a perspective view of the highway carriage.

In the exemplary embodiment of the invention shown in FIG. 1, the semi-trailer 1 has a removable highway carriage with three axles, which is intended to be mounted in the zone 1a.

As shown in FIG. 1a, the highway carriage is mounted on the semi-trailer by a lateral maneuver at one of the sides of the semi-trailer, employing T-profiles 2a mounted transversely on the highway carriage. To assist in the maneuver, a sliding table P, or suitable means mounted on the highway carriage itself, may be employed.

The system for lateral mounting and dismounting of the highway carriage simplifies the formation of railroad trains and also simplifies the re-conversion to road-operable semi-trailers.

The channels 1a into which the T-profiles 2a of a highway carriage 2 come to be inserted are formed in a frame which is rigidly attached to the chassis 15 of the semi-trailer. Also provided are lateral reinforcing beams 1c.

The semi-trailer also has a hemispherical center-bearing counter-element 18 near its rear end and rigidly attached to the chassis part which bears it. This bearing counter-element is for connecting the semi-trailer to the center pin socket 3a of the rail truck 3.

FIGS. 2a to 2e show the maneuvers required to replace the highway carriage with the rail truck when it is desired to convert from road to rail operation.

Figure 2:
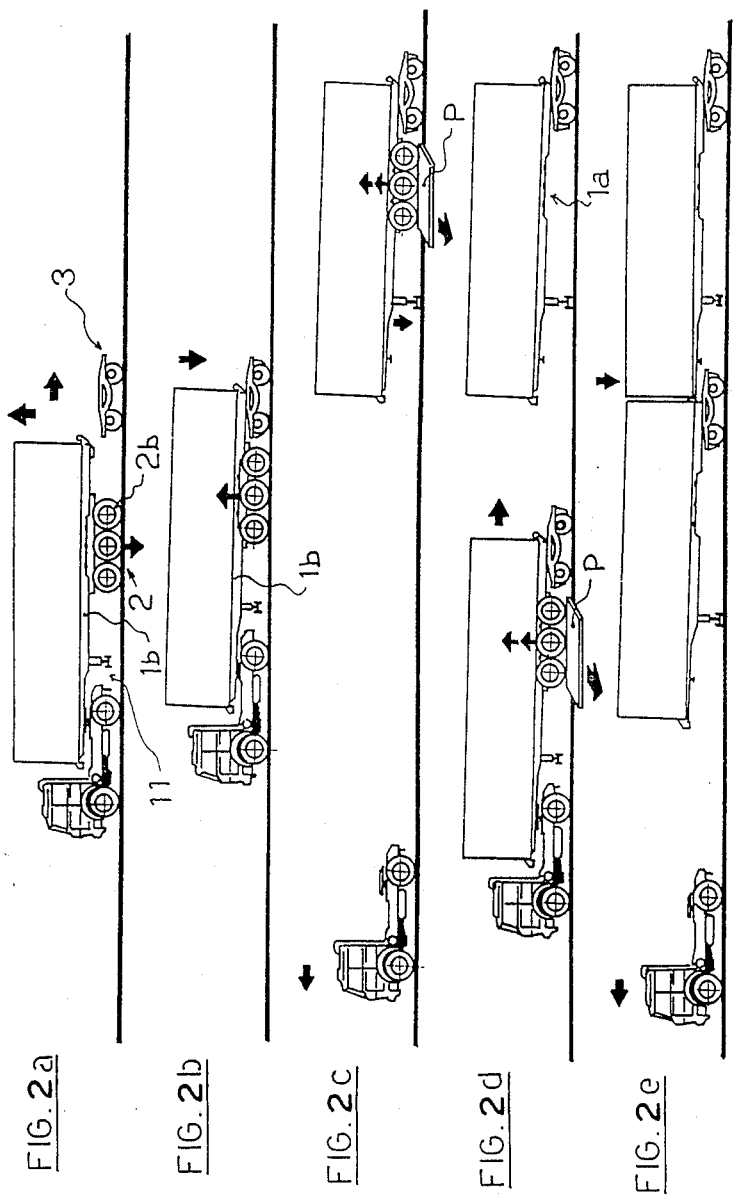
FIGS. 2a–2e show the manuever for changing the arrangement from that for road travel to that for rail travel including replacing the highway carriage with a rail truck), and the linking together of two semi-trailers.

In FIG. 2a the load-carrying chassis 1b of the semi-trailer is lifted using the pneumatic suspension of the wheels 2b of the highway carriage to move the bearing counter-element 18 attached to the semi-trailer to an elevation above the center pin socket 3a of the rail truck 3.

In FIG. 2b the chassis 1b is lowered onto the rail truck, again using the suspension of the wheels of the highway carriage. This establishes the main connection of the rail truck to the semi-trailer, wherewith the bearing counter-element 18 is inserted in the center pin socket 3a of the rail truck 3.

In FIG. 2c, the wheels of the highway carriage are re-lifted by suitable means disposed between the axles of the wheels 2b and the frame of the highway carriage 2, to enable introduction of the sliding table P, whereafter the highway carriage itself is removed. Alternatively, the means for lifting the wheels may be combined with gear systems, wheels, rollers, and/or other devices which enable transverse movements of the highway carriage relative to the longitudinal axis of the semi-trailer.

In FIGS. 2d and 2e the maneuver is shown whereby a second road-operable semi-trailer is coupled to the railroad train.

Figure 3:
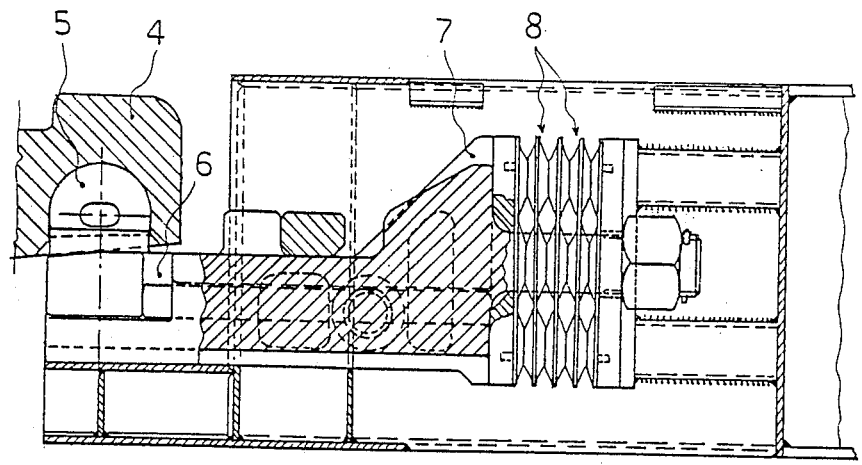
FIG. 3 shows the elastic coupling device operative between two semi-trailers.
Figure 4:
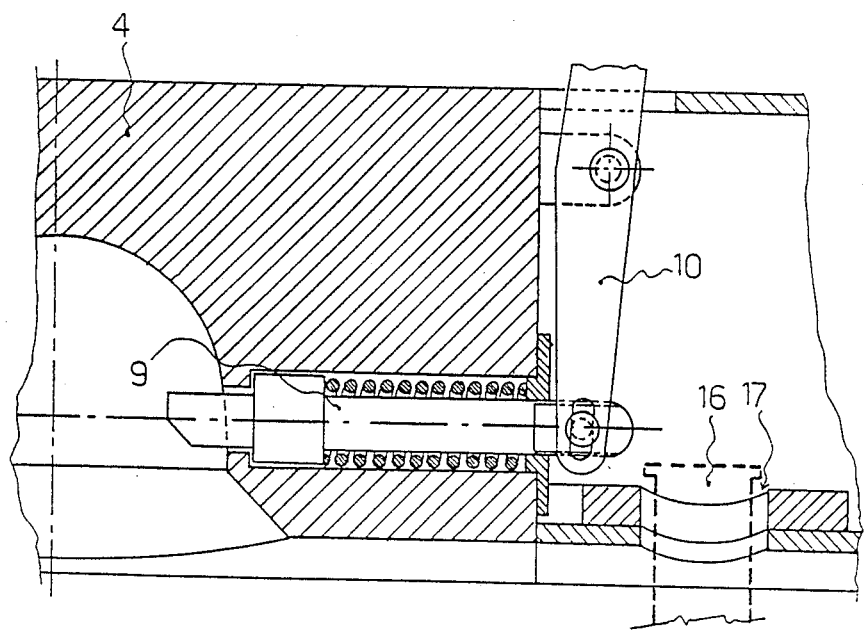
FIG. 4 shows the device which locks the coupling system between two semi-trailers.

The coupling between the semi-trailers on the rails may be comprised of the device illustrated in FIG. 3.

The device is comprised of two bodies having hemispherical surfaces, one being concave and the other convex. These are disposed, respectively, on the front chassis end of the one of the semi-trailers and the rear chassis end of the other.

The ball element 5 is mounted on a sliding member 6 which is slidably mounted in a guide or housing 7 and is acted on by an elastic rubber element 8.

An anchor pin 9 with an associated lever 10 is provided, to lock the ball element 5 and socket element 4 together while allowing relative rotation around an axis normal to the plane of the tracks, so as to allow negotiating a curve with minimum radius of 90 meters.

The coupling involves the support of the socket element on the ball element. Hence the ball element is subjected to forces of compression and traction.

The external surface of the ball element is characterized by a spherical shape extending to 105° from the apex, in the longitudinal plane, and to about 80° from the apex, in the transverse plane of the semi-trailer.

The use of the ball element 5 is justified by the need to enable rotation simultaneously around two axes, wherewith the resultants of the forces of connection of the coupling are inclined not more than 80° from the vertical in the longitudinal plane the forces comprising a vertical force of 20 ton and a horizontal force of 100–120 ton and 20° from the vertical force of 20 ton and a horizontal force of 10 ton for offsetting the centrifugal force on curves.

The connection of the center pin socket 3a of the rail truck to the hemispherical center-bearing counter-element 18 mounted on the underside of the rear of the chassis of the semi-trailer in correspondence with the socket 3a is illustrated in FIG. 5.

The bearing counter-element mounted on the underside of the end of the semi-trailer is locked to the center pin socket 3a of the rail truck 3 by an automatic device consisting of a small piston device 3b which, when it is pressed upon by the plate 18a of the bearing counter-element, releases the pin 3c which then is elastically displaced so as to lock the plate 18a in place.

When the plate 18a is pressed further against the lever 3d from the top, which forces the vertical pin 3e against the horizontal pin 3c so that, when the horizontal pin 3c is moved in the direction of the arrow, the vertical pin 3e can fix the horizontal pin 3c in a position to lock the bearing counter-element in place.

The front support prop 11 is characterized by wheels 11a used for support against the ground. These wheels are mounted on an axis parallel to the longitudinal axis of the semi-trailer, thereby enabling any desired transverse displacement of the end of the semi-trailer disposed opposite to the end supported on the rail truck, in order to align the semi-trailer with the longitudinal median axis of the rails.

The invention also provides for automatic connection of the pneumatic and/or hydraulic braking circuit of the rail truck to that of the semi-trailer.

In a variant, the highway carriage 2 may be furnished with means which permit the dismounting of the highway carriage from the rear of the semi-trailer, disengaging longitudinally. In such a case, the semi-trailer must be lifted by means external to the highway carriage.

FIG. 5 illustrates an exemplary embodiment of the device whereby the compressed air tubes of the braking circuit of the semi-trailer are connected to the tubes feeding the braking device of the rail truck.

This device is comprised of conical male fittings 12 acted on by springs mounted on the hemispherical center-bearing counter-element, wherewith when fittings 12 come into contact with conical female fittings 13 mounted on the center pin socket they penetrate into fittings 13 to establish a pneumatic connection. Toward this end, the springs 12a of the fittings 12 mounted on the bearing counter-element are acted on by a plate 3f rigidly connected to the bearing counter-element.

The jacks 14 for lifting to enable disconnection of the highway carriage from the rear, if equipped with the necessary means, may be incorporated on the semi-trailer chassis. In such a case they are mounted at the sides of the rear region or near the rear end of the side walls, and are of the telescopic type FIG. 1.

For the maneuver whereby the rail truck is substituted for the highway carriage, the semi-trailer is aligned over the tracks and is raised sufficiently by the jacks 14. When the highway carriage is removed from the rear region of the semi-trailer and the rail truck is inserted.

The connection to the center pin socket of the highway truck tractor is accomplished with the pin 15. Any alternative type of mechanical mounting arrangement may be used for the highway carriage, provided that said arrangement is adapted to enable removal of the highway carriage.

I claim:

1. A semi-trailer adapted to travel on rails and on roads, comprising:
    first means for automatic connection to the rear end of a second semi-trailer of the same type to form a train of rail-operable semi-trailers,
    second means for connecting to a highway truck tractor so as to function as a highway semi-trailer, said second connecting means including a pin to engage a center pin socket; means for mounting a removable rail truck beneath said semi-trailer, which mounting means includes a hemispherical center-bearing counter-element and a highway carriage;
    the highway carriage being removable and including independent T-profiles and T-channels mountable on the semi-trailer by mechanical means attached to chassis of said semi-trailer and to the frame of the highway carriage, whereby such a highway carriage can be rapidly removed to allow rail travel with only the single rail truck and road travel being enabled by only the single highway carriage, wherewith the highway carriage is equipped with an elastic suspension adapted to enable hydraulic or pneumatic raising and lower of the chassis of the semi-trailer above the rail truck when it is desired to insert said rail truck.

2. A semi-trailer according to claim 1, wherein said T-channels have T-shaped cross-sections formed in a body attached to the chassis of the semi-trailer, and said T-profiles are insertable within said T-channels to enable mounting and removing of the highway carriage from the semi-trailer.

3. A semi-trailer according to claim 1, further comprising jacks disposed exteriorly of the highway carriage to enable lifting of the chassis of the semi-trailer and maintaining of said chassis in an elevated position to enable mounting of the highway carriage into a longitudinal mounted position with respect to the axis of the semi-trailer, which mounting is to be at one of the rear and front parts of the semi-trailer wherewith said jacks are mounted in positions whereby the jacks do not impede the mounting or dismounting of the highway carriage.

4. A semi-trailer according to claim 1, further comprising said highway carriage being provided with two or more wheels, wherewith said mounting means enable only one at a time of the rail truck and the highway carriage to be mounted beneath said semi-trailer.

5. A semi-trailer according to claim 1, further comprising:
    a vertically moveable coupling device disposable between semi-trailers, said coupling device having an elastic spring, a sliding member slidably guided into a guide under longitudinal action of an elastic spring, said coupling device comprising two bodies, each body having a spherical surface, one concave socket member and one convex solid ball member, disposed respectively on the front and rear of two semi-trailers, said ball member being rigidly mounting on said sliding member; and
    a lever and locking pin maneuverable by said lever for locking said ball member, wherewith a coupling maneuver between the socket member and ball member may be executed by setting the socket member down on the ball member, with a coupling arrangement functioning even in the middle of a train.

6. A semi-trailer according to claim 1, further comprising support props attachable to said semi-trailer, said support props each including an axle disposed parallel to a longitudinal axis of the semi-trailer, and wheels mounted upon each said axle.

7. A semi-trailer according to claim 1, further comprising:
    a pin member;
    a piston;
    a plate mounted on the bearing counter-element;
    a lever; and
    a locking device;
    whereby coupling of the hemispherical center-bearing counter-element to the center pin socket of the rail truck occurs automatically through force of the bearing counter-element against the center pin socket, wherewith locking together of said bearing counter-element and said center pin socket is achieved by said pin member being forced against said plate, which pin is maintained in a blocked position by the piston until the piston is lowered due to pressure on the plate of said bearing counter-element, and said lever acted upon by said plate of the bearing counter-element is prevented from moving above the plate, wherewith further depression of said lever causes upward actuation of said locking device to lock the pin in a retracted position when the pin is moved in a first direction during removal of the bearing counter-element from engagement with the center pin socket.

8. A semi-trailer according to claim 1, further comprising means associated with the hemispherical center-bearing counter-element and counter pin socket of the rail truck, for enabling connection between brake circuits of the semi-trailer and brake system of the rail truck, said enabling means including male fitting elements having a truncated conical configuration, said male elements engaging conical female fittings when the bearing counter-element is brought into contact with the internal surface of the center pin socket.

* * * * *